United States Patent [19]
Tseng

[11] Patent Number: 5,498,165
[45] Date of Patent: Mar. 12, 1996

[54] COMBINED HINGE AND ELECTRICAL CONNECTOR FOR PORTABLE COMPUTER

[75] Inventor: Lyre Tseng, Hsin-Chuang, Taiwan

[73] Assignee: Chiahuan Spring Co., Ltd., Taipei Hsien, Taiwan

[21] Appl. No.: 272,008

[22] Filed: Jul. 8, 1994

[51] Int. Cl.⁶ .................................................. H01R 35/00
[52] U.S. Cl. ........................ 439/31; 16/223; 364/708.1
[58] Field of Search ..................... 439/31, 165; 361/681, 361/682; 364/708.1; 16/223; 220/342

[56] References Cited

U.S. PATENT DOCUMENTS

| | | | |
|---|---|---|---|
| 4,802,605 | 2/1989 | Salmon et al. | 16/267 |
| 4,825,395 | 4/1989 | Kinser, Jr. et al. | 364/708 |
| 4,959,887 | 10/1990 | Gruenberg et al. | 364/708 X |
| 5,127,842 | 7/1992 | Kelly | 439/31 X |
| 5,182,699 | 1/1993 | Kobayashi | 361/395 |
| 5,325,984 | 7/1994 | Ady | 220/342 |

OTHER PUBLICATIONS

IBM Tech. Bulletin, vol. 34, No. 9, Feb 1992.

*Primary Examiner*—William Briggs
*Attorney, Agent, or Firm*—Harness, Dickey & Pierce

[57] ABSTRACT

A portable computer includes an upper housing for receiving a monitor, and a lower housing pivoted to the upper housing by means of a hinge assembly for receiving a computer processing unit. A connector unit includes an electrical connector having input terminals adapted to connect electrically with the computer processing unit and output terminals provided with conducting wires adapted to connect electrically with the monitor. The hinge assembly includes a first hinge unit which has a hollow pivot shaft and a first coupling member that extends radially from the hollow pivot shaft for connection with the upper housing, and a second hinge unit which has a sleeve portion that is sleeved rotatably on the hollow pivot shaft and a second coupling member that extends radially from the sleeve portion for connection with the lower housing. The hollow pivot shaft and the sleeve portion cooperatively define a space for the passage of the conducting wires from the electrical connector to the upper housing. The connector unit further includes a casing which is mounted on the lower housing and which has an accommodation portion that is communicated with the sleeve portion of the second hinge unit and that receives the electrical connector therein.

4 Claims, 5 Drawing Sheets

COMBINED HINGE AND ELECTRICAL CONNECTOR FOR PORTABLE COMPUTER

BACKGROUND OF THIS INVENTION

1. Field of the Invention

This invention relates to a combined hinge and electrical connector assembly for a portable computer, more particularly to a combined hinge and electrical connector assembly with a hinge which has a hollow pivot shaft and a sleeve portion that are sleeved rotatably on each other and that cooperatively define a space for the passage of conducting wires from an electrical connector on a lower housing to an upper housing of the portable computer.

2. Description of the Related Art

The improvement of this invention is directed to a a conventional portable computer which includes an upper housing that receives a monitor thereon, and a lower housing that receives a keyboard and a computer processing unit thereon. The upper housing is pivoted to the lower housing by means of a hinge assembly so as to allow the monitor to be opened to a usable position. The electrical connection between the monitor and the computer processing unit is established by means of two electrical connectors which are positioned respectively within the upper and lower housings and which are connected electrically to each other by means of several conducting wires that extend from the lower housing to the upper housing.

Generally, in the conventional hinge assembly, the conducting wires have to extend through gaps formed in the upper and lower housings so as to enter the same to interconnect electrically the electrical connectors within the upper and lower housings, thereby connecting electrically the computer processing unit to the monitor. However, it is quite inconvenient for a manufacturer to arrange the conducting wires from the lower housing to the upper housing in the above-described manner to interconnect electrically the electrical connectors when manufacturing the portable computer. Of course, it still be quite difficult for a manufacturer to remove the upper housing from the lower housing in order to replace an old monitor with a new one. In addition, when the electrical connectors are out of order during use, it is also difficult to remove the electrical connectors from the upper and lower housings so as to replace the broken electrical connectors with new ones.

SUMMARY OF THE INVENTION

Therefore, the main objective of this present invention is to provide a portable computer with a combined hinge and electrical connector assembly, the hinge having a hollow pivot shaft and a sleeve portion that are sleeved rotatably on each other and that cooperatively define a space for the passage of conducting wires from an electrical connector on a lower housing to an upper housing of the portable computer in order to facilitate electrical connection of a computer processing unit with a monitor of the portable computer.

According to this invention, a combined hinge and electrical connector assembly for a portable computer includes a connector unit and a hinge assembly. The portable computer includes an upper housing for receiving a monitor thereon and a lower housing for receiving a computer processing unit thereon. The connector unit has an electrical connector for interconnecting electrically the monitor and the computer processing unit. The hinge assembly can interconnect pivotally the upper and lower housings. The electrical connector has input terminals adapted to contact electrically with the computer processing unit and output terminals provided with conducting wires that are adapted to connect electrically with the monitor. The hinge assembly includes a first hinge unit which has a hollow pivot shaft and a first coupling member that extends radially from the hollow pivot shaft for connection with the upper housing, and a second hinge unit which has a sleeve portion that is sleeved rotatably on the hollow pivot shaft and a second coupling member that extends radially from the sleeve portion for connection with the lower housing. The hollow pivot shaft and the sleeve portion cooperatively define a space for the passage of the conducting wires from the electrical connector to the upper housing. The connector unit further includes a casing which is mounted on the lower housing and which has an accommodation portion that is communicated with the sleeve portion of the second hinge unit. The electrical connector is disposed in the accommodating portion of the casing so as to facilitate electrical connection of the computer processing unit with the monitor by extending the conducting wires from the electrical connector through the space, defined by the hollow pivot shaft and sleeve portion, into the upper housing.

BRIEF DESCRIPTION OF THE DRAWINGS

Other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 3:
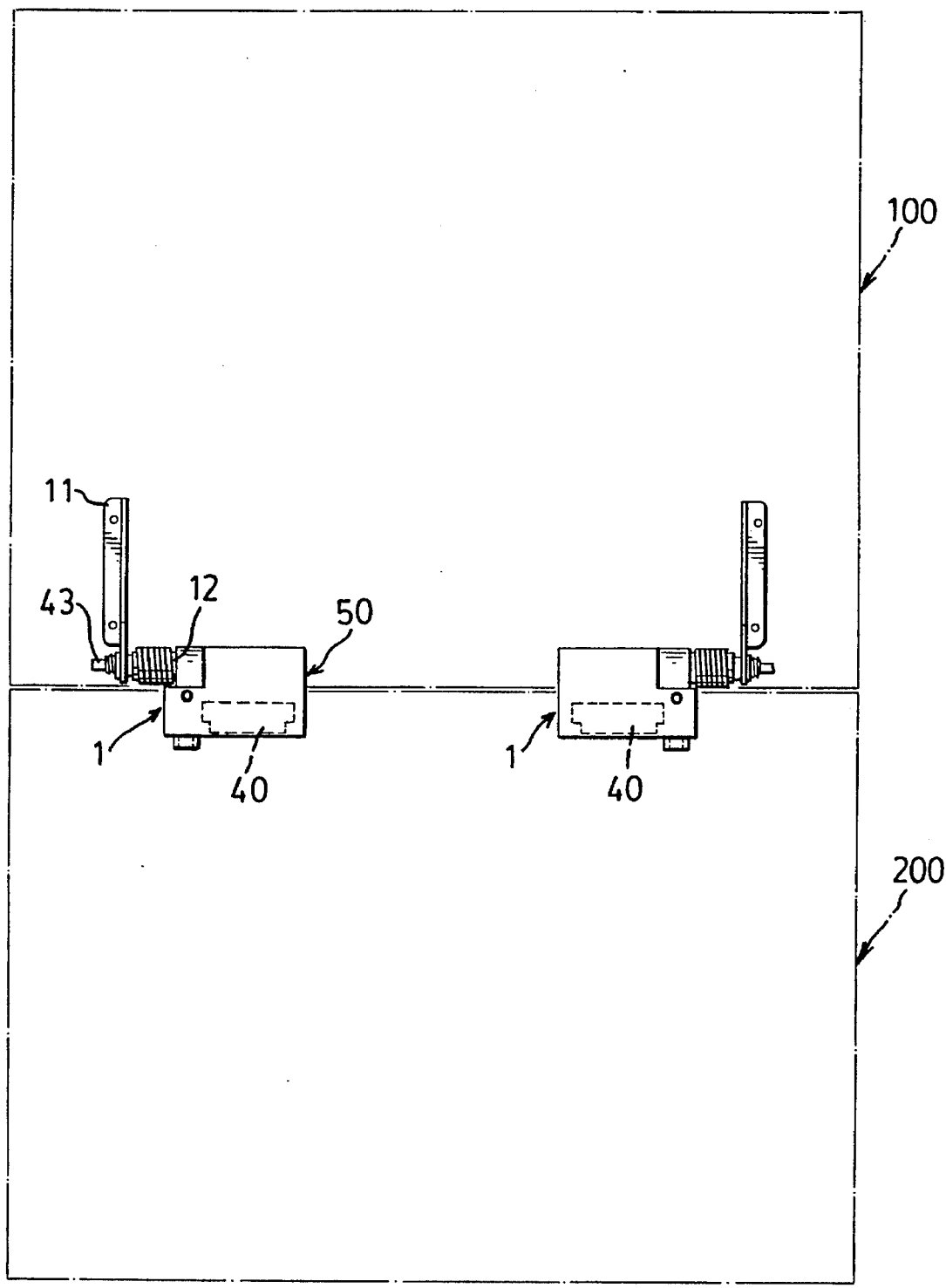
FIG. 3 is a schematic view illustrating how the combined hinge and electrical connector unit is applied to the portable computer in accordance with the first preferred embodiment of this invention.

Referring to FIG. 3, a portable computer of the first preferred embodiment of this invention includes an upper housing 100 for receiving a monitor thereon, and a lower housing 200 connected pivotally to the upper housing 100 by means of a hinge assembly 1 for receiving a computer processing unit and a keyboard thereon.

Figure 1:
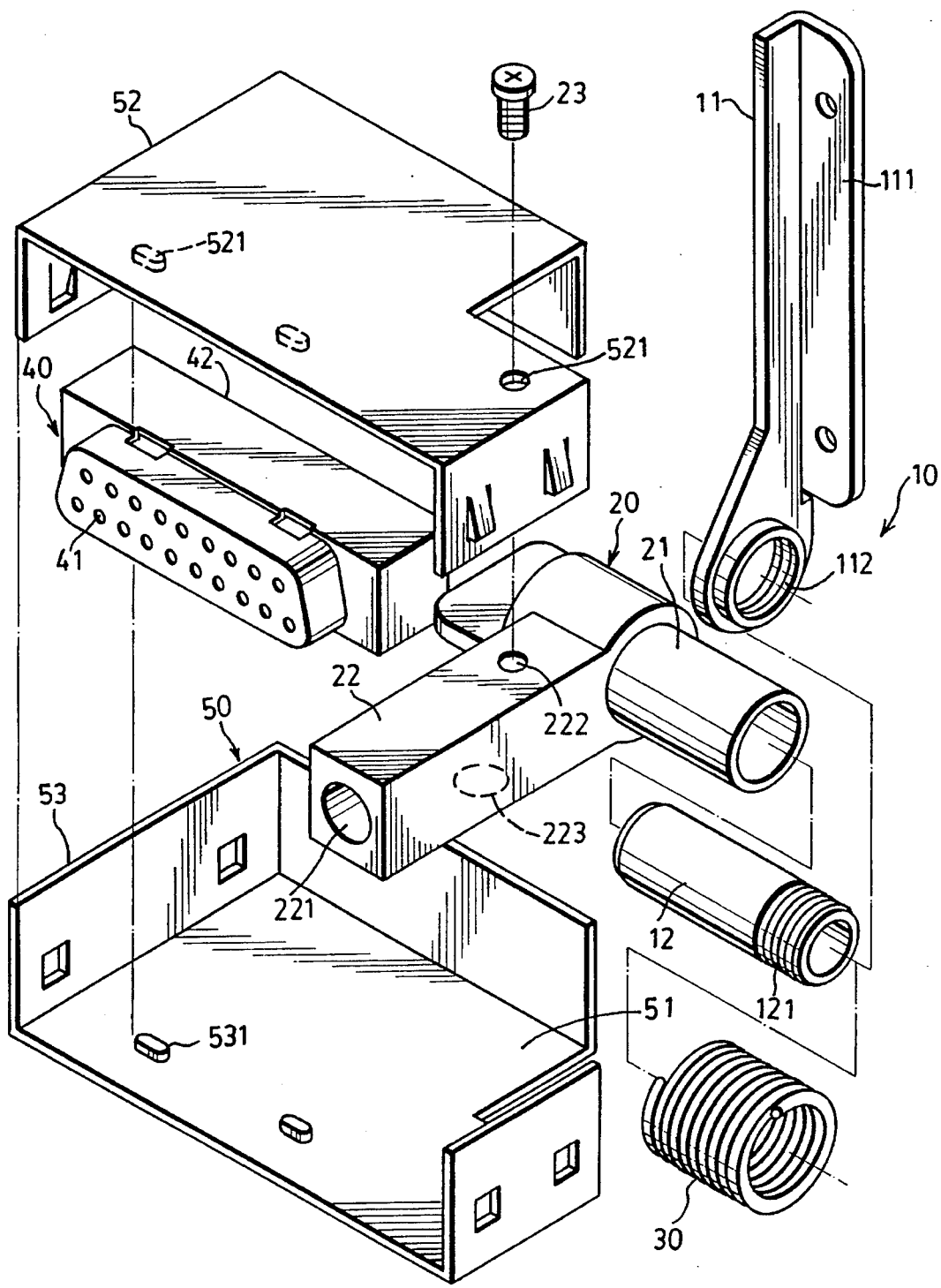
FIG. 1 is an exploded view showing a combined hinge and electrical connector assembly which are employed in a portable computer according to the first preferred embodiment of this invention.

The hinge assembly 1, as shown in FIG. 1, includes a first hinge unit 10 and a second hinge unit 20 which are connected pivotally to each other.

The first hinge unit 10 includes a hollow pivot shaft 12 which has an externally threaded section 121 formed on one end portion thereof, and a first coupling member 11 which has a plate section 111 that is mounted securely on the upper housing 100 (see FIG. 3) and an internally threaded hole 112 that is connected threadably to the externally threaded section 121 of the hollow pivot shaft 12 so as to allow the hollow pivot shaft 12 to rotate synchronously with the first coupling member 11 when the upper housing 100 rotates relative to the lower housing 200.

The second hinge unit 20 includes a sleeve portion 21 which is sleeved rotatably on the hollow pivot shaft 12, and a second coupling member 22 which extends radially from the sleeve portion 21 for connection with the lower housing 200 (see FIG. 3) by means of a bolt (not shown) that is locked on the lower housing 200 and that engages a threaded hole 221 which is formed in a distal end surface of the second coupling member 22 or a threaded hole 223 which is formed in a bottom surface of the second coupling member 22, thereby locking the second hinge unit 20 on the lower housing 200. The hollow pivot shaft 12 and the sleeve portion 21 cooperatively define a space 211 (see FIG. 2). The sleeve portion 21 of the second hinge unit 20 has an inner surface which is in friction contact with an outer surface of the hollow pivot shaft 12 of the first hinge unit 10 so that, when the first hinge unit 10 is rotated relative to the second hinge unit 20, the upper housing 100 can be held at a certain angular position relative to the lower housing 200 by means of friction between the inner surface of the sleeve portion 21 and the outer surface of the hollow pivot shaft 12.

A cylindrical spring coil 30 is sleeved forcibly around an outer surface of the sleeve portion 21 of the second hinge unit 20 for pinching the sleeve portion 21 against the hollow pivot shaft 12 so as to provide friction between the inner surface of the sleeve portion 21 and the outer surface of the hollow pivot shaft 12.

Figure 2:
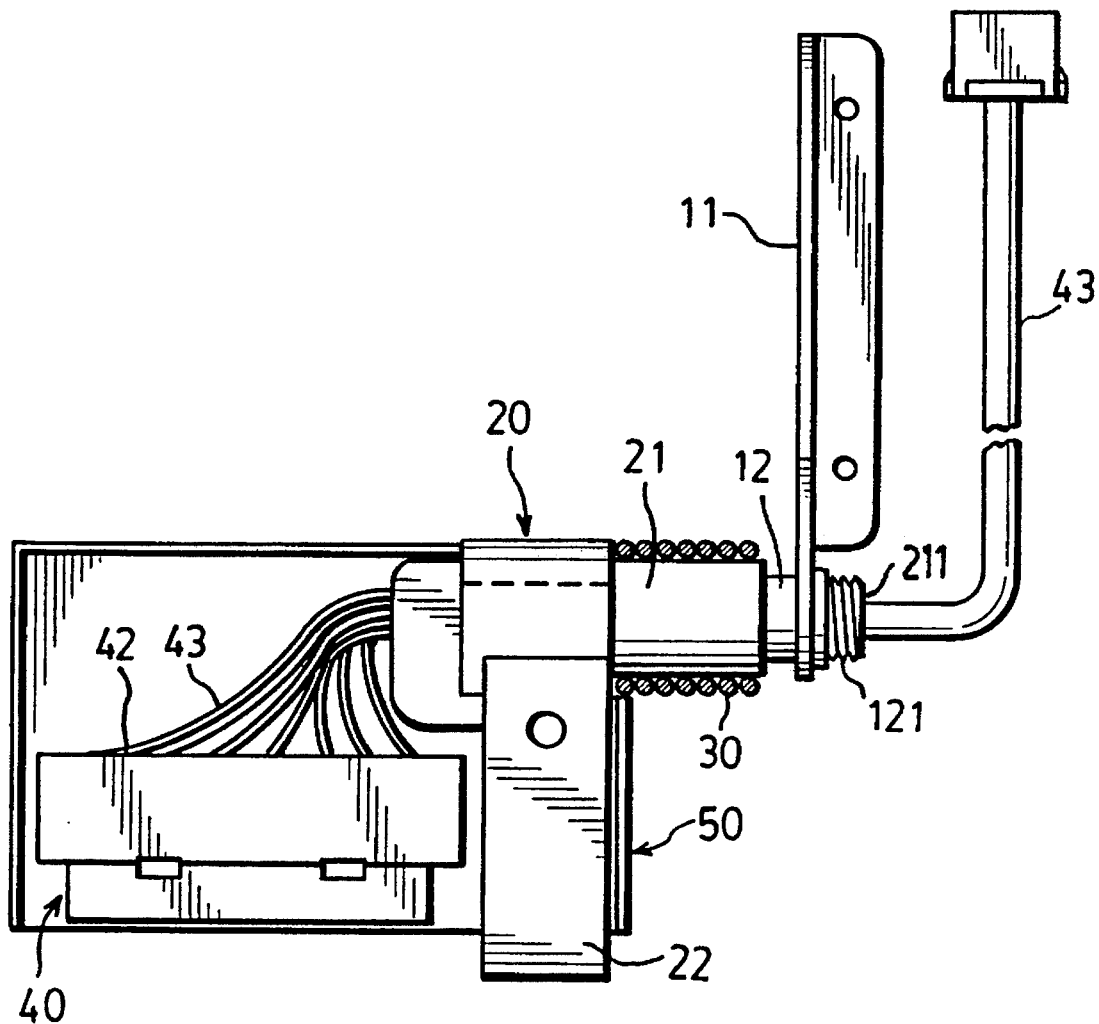
FIG. 2 is a schematic view illustrating the combined hinge and electrical connector assembly in accordance with the first preferred embodiment of this invention.

A connector unit includes an electrical connector 40 and a casing 50 which is a piece separate from the connector unit 40. The electrical connector 40 has input terminals 41 which are adapted to connect electrically with output terminals of another electrical connector (not shown) that is mounted on the lower housing 200 and that is to be connected electrically with the computer processing unit, and output terminals 42 which are provided with several conducting wires 43, as shown in FIG. 2, that extend through the space 211, which is defined by the sleeve portion 21 and the hollow pivot shaft 12, into the upper housing 100 to connect electrically with the monitor, thereby connecting electrically the computer processing unit with the monitor. Owing to the space 211 formed in the hinge assembly 1, the conducing wires 43 can be easily arranged from the lower housing 200 to the upper housing 100 by extending the same through the space 211 of the hinge assembly 1.

Referring again to FIG. 1, the casing 50 has a cover plate portion 52 and a base plate portion 53 which are coupled with each other to define an accommodation portion 51 therebetween for receiving the electrical connector 40 therein. The accommodation portion 51 is communicated with the sleeve portion 21 of the second hinge unit 20. The cover plate portion 52 and the base plate portion 53 respectively have two positioning noses 521, 531 for positioning the electrical connector 40 in the accommodation portion 51. The casing 50 is mounted removably on the lower housing 100 so as to facilitate electrical connection of the electrical connector 40 with another electrical connector on the lower housing 200. The casing 50 is further connected removably to the second coupling member 22 of the second hinge unit 20 by means of a bolt 23 which extends through a hole 521 of the cover portion 52 to engage a threaded hole 222 of the second coupling member 22, thereby positioning the casing 50 on the second coupling member 22 of the second hinge unit 20. Since the connection between the casing 50 and the second hinge unit 20 is established by means of the bolt 23, the rotation of the hinge assembly 1 can reduce the vibration of the casing 50, thereby eliminating signal interference to signals transmitted by the electrical connector 40. In addition, because the electrical connector 40 is easily removed from the casing 50 so as to disconnect from the electrical connector within the lower housing 200, it is quite convenient for a manufacturer to replace the original monitor with another type of monitor. Of course, even though the electrical connector 40 is out of order, it is easy for the manufacturer to replace the broken electrical connector 40 with a new one.

Figure 4:
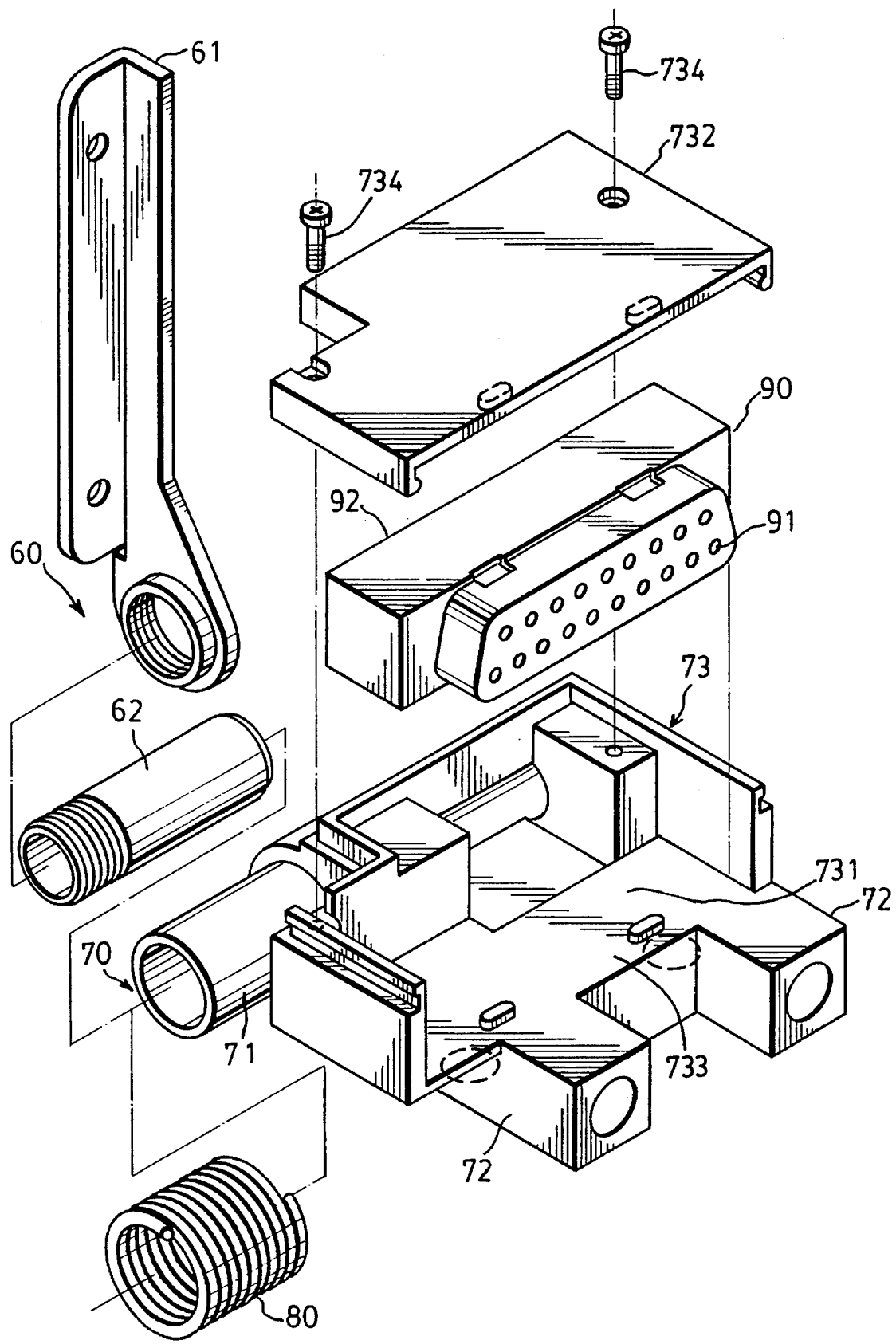
FIG. 4 is an exploded view showing a combined hinge and electrical connector assembly which are employed in a portable computer according to the second preferred embodiment of this invention.

Referring to FIG. 4, a combined hinge and electrical connector assembly of the second preferred embodiment of this invention is attached to a portable computer which includes an upper housing and a lower housing which are similar in construction to those of the first preferred embodiment of this invention and which are connected pivotally each other to by a hinge assembly.

The hinge assembly includes a first hinge unit 60 and a second hinge unit 70 which are connected pivotally to each other.

The first hinge unit 60 is similar in construction to the first embodiment of this invention and includes a hollow pivot shaft 62 and a first coupling member 61 which extends radially from the hollow pivot shaft 62 for connection with the upper housing in the same manner as that of the first embodiment so as to allow the hollow pivot shaft 62 to rotate synchronously with the first coupling member 61.

Figure 5:
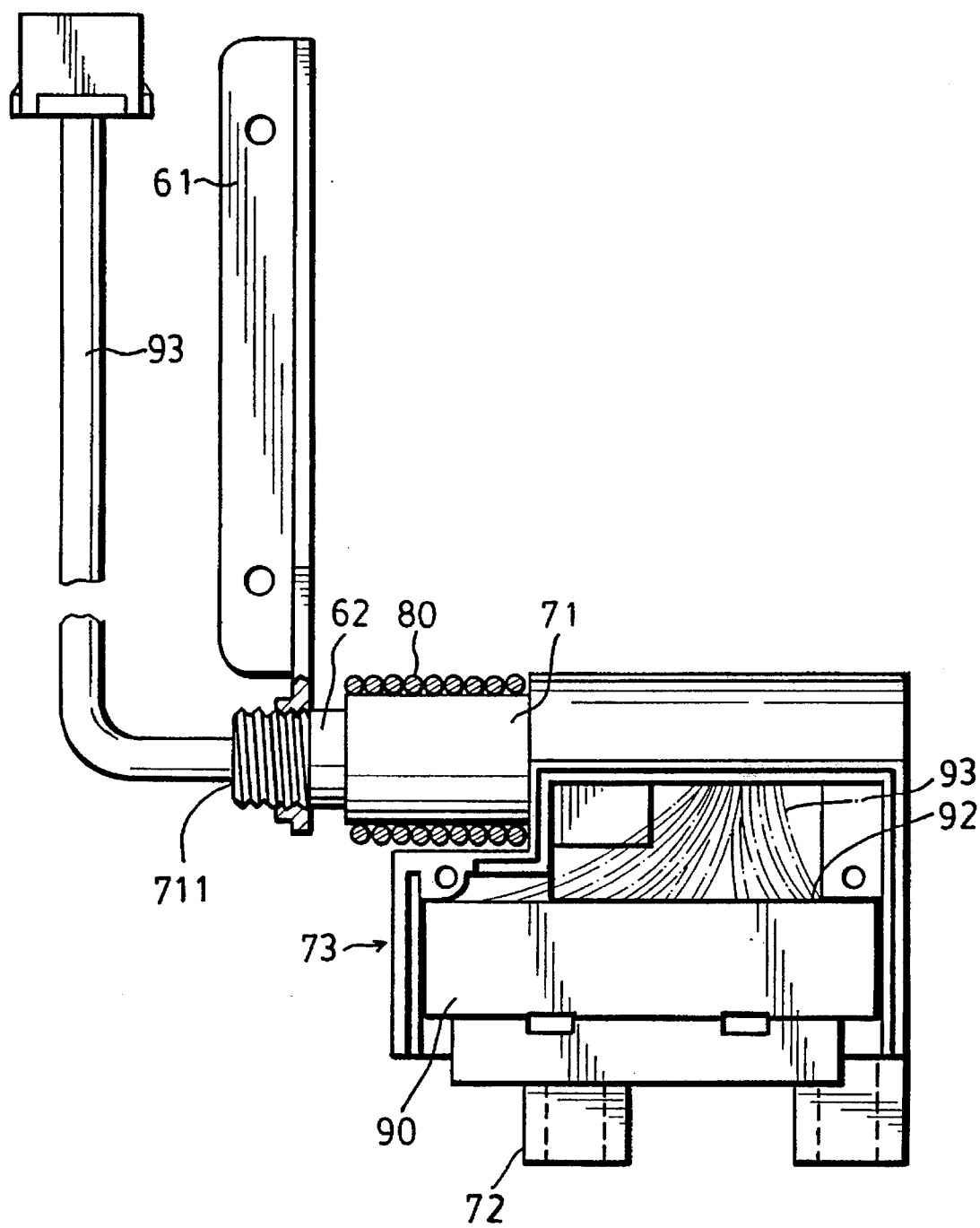
FIG. 5 is a schematic view illustrating the combined hinge and electrical connector assembly according to the second preferred embodiment of this invention.

The second hinge unit 70 includes a sleeve portion 71 which is sleeved rotatably on the hollow pivot shaft 62. A connector unit includes a casing 73 which has a base plate portion 733 that is formed integrally with the sleeve portion 71 and a cover plate portion 732 that is locked on the base plate portion 733 by means of two bolts 734 in a known manner for defining an accommodation portion 731 between the cover and base plate portions 732, 733. The accommodation portion 731 receives an electrical connector 90 which is similar in construction to that of the first embodiment, and is communicated with the sleeve portion 71. Two second coupling members 72 extend from the bottom surface of the base plate portion 733 for connection with the lower housing in the same manner as that of the first embodiment so as to lock the second hinge unit 20 on the lower housing. In this way, the casing 73 can be fixed to the lower housing. The hollow pivot shaft 62 and the sleeve portion 71 cooperatively define a space 711, as shown in FIG. 5, for the passage of conducting wires 93 from output terminals 92 of the electrical connector 90 to the upper housing. The inner surface of the sleeve portion 71 is in friction contact with the outer surface of the hollow pivot shaft 62 so that the upper housing can be held at a certain angular position relative to the lower housing. A cylindrical spring coil 80, when sleeved forcibly around the outer surface of the sleeve portion 71 to pinch the sleeve portion 71 against the hollow pivot shaft 62, can provide friction between the inner surface of the sleeve portion 71 and the outer surface of the hollow pivot shaft 62. In the second embodiment, the electrical connector 90 can have its input terminals 91 contacting electrically with output terminals of another electrical connector (not shown) which is mounted on the lower housing for connecting electrically the computer processing unit to the monitor on the upper housing.

In this embodiment, the conducting wires 93 can also be arranged easily similar to the first embodiment to extend from the lower housing to the upper housing by extending the same through the space 711 of the hinge assembly. In addition, the electrical connector 90 can be easily removed from the casing 73 so as to disconnect from the electrical connector 90 within the lower housing, thereby facilitating the replacement of the original monitor with another type of monitor. Even though the electrical connector 90 is out of order, it is easy for the manufacturer to replace the broken electrical connector 90 with a new one.

With this invention thus explained, it is apparent that numerous modifications and variations can be made without departing from the scope and spirit of this invention. It is therefore intended that this invention be limited only as indicated in the appended claims.

I claim:

1. A combined hinge and electrical connector assembly for a portable computer, said portable computer including an upper housing for receiving a monitor thereon and a lower housing connected pivotally to said upper housing for receiving a computer processing unit thereon, said combined hinge and electrical connector assembly comprising:

a connector unit including an electrical connector which has input terminals adapted to connect electrically with said computer processing unit and output terminals provided with conducting wires adapted to connect electrically with said monitor; and a hinge assembly interconnecting pivotally said upper and lower housing and including:

a first hinge unit including a hollow pivot shaft and a first coupling member which extends radially from said hollow pivot shaft for connection with said upper housing; and a second hinge unit including a sleeve portion which is sleeved rotatably on said hollow pivot shaft and a second coupling member which extends radially from said sleeve portion for connection with said lower housing, said hollow pivot shaft and said sleeve portion cooperatively defining a space for passage of said conducting wires from said electrical connector to said upper housing, said sleeve portion of said second hinge unit having an inner surface which is in friction contact with an outer surface of said hollow pivot shaft of said first hinge unit, a cylindrical spring coil sleeved around an outer surface of said sleeve portion of said second hinge unit for pinching said sleeve portion against said hollow pivot shaft so as to provide friction between said inner surface of said sleeve portion and said outer surface of said hollow pivot shaft so that said upper housing can be held at a certain angular position relative to said lower housing by means of friction between said inner surface of said sleeve portion and said outer surface of said hollow pivot shaft.

2. A combined hinge and electrical connector assembly as claimed in claim 1, wherein said connector unit further includes a casing which is mounted on said lower housing and which has an accommodation portion that is communicated with said sleeve portion of said second hinge unit for receiving said electrical connector therein.

3. A combined hinge and electrical connector assembly as claimed in claim 2, wherein said casing of said connector unit is a piece separate from said connector unit.

4. A combined hinge and electrical connector assembly as claimed in claim 2, wherein said casing of said connector unit is formed integrally with said second hinge unit.

\* \* \* \* \*